(12) United States Patent
Tanigaki et al.

(10) Patent No.: US 12,148,578 B2
(45) Date of Patent: Nov. 19, 2024

(54) ELECTROLYTIC CAPACITOR (71) Applicant: Panasonic Intellectual Property Management Co., Ltd., Osaka (JP)

(72) Inventors: Nobuhiro Tanigaki, Saga (JP); Makoto Maruoka, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 17/821,708

(22) Filed: Aug. 23, 2022

(65) Prior Publication Data

US 2022/0399169 A1  Dec. 15, 2022

Related U.S. Application Data

(63) Continuation of application No. PCT/JP2021/010995, filed on Mar. 18, 2021.

(30) Foreign Application Priority Data

Mar. 23, 2020 (JP) .................... 2020-050694

(51) Int. Cl.
*H01G 9/012* (2006.01)
*H01G 9/08* (2006.01)

(52) U.S. Cl.
CPC .............. *H01G 9/012* (2013.01); *H01G 9/08* (2013.01)

(58) Field of Classification Search
None
See application file for complete search history.

(56) References Cited

U.S. PATENT DOCUMENTS

| 2007/0019366 A1* | 1/2007 | Yamaguchi | H01G 9/08 361/540 |
| 2008/0002335 A1* | 1/2008 | Kurita | H01G 9/012 29/25.03 |
| 2009/0147448 A1* | 6/2009 | Matsuoka | H01G 9/012 361/540 |

(Continued)

FOREIGN PATENT DOCUMENTS

| CN | 101452765 A * | 6/2009 | ............. H01G 9/012 |
| JP | 2001-110676 | 4/2001 | |

(Continued)

OTHER PUBLICATIONS

International Search Report of PCT application No. PCT/JP2021/010995 dated Jun. 15, 2021.

*Primary Examiner* — Dion R. Ferguson
(74) *Attorney, Agent, or Firm* — Rimon P.C.

(57) ABSTRACT

An electrolytic capacitor includes a bottom surface and a top surface, and includes a capacitor element including an anode lead, an anode lead terminal and a cathode lead terminal each electrically connected to the capacitor element, and exterior resin 101. At least one of the anode lead terminal or the cathode lead terminal includes a terminal part exposed at the bottom surface, and two anchor parts each extending from the terminal part and embedded in the exterior resin. The terminal part includes a side end along a direction in which the anode lead extends. Each of the two anchor parts includes an upright part rising from the side end of the terminal part toward the top surface, and an extending part bending and extending from an upper end of the upright part.

6 Claims, 4 Drawing Sheets

(56) References Cited

U.S. PATENT DOCUMENTS

| 2015/0116909 | A1* | 4/2015 | Kwak | H01G 9/012 361/529 |
| 2022/0399169 | A1* | 12/2022 | Tanigaki | H01G 9/08 |
| 2024/0006128 | A1* | 1/2024 | Matsumoto | H01G 9/10 |

FOREIGN PATENT DOCUMENTS

| JP | 2006-270014 | | 10/2006 | |
| JP | 2006270014 A | * | 10/2006 | H01G 9/012 |
| JP | 2007-035691 | | 2/2007 | |
| JP | 2003068576 A | * | 3/2007 | H01G 9/012 |
| JP | 2015-088718 | | 5/2015 | |
| WO | WO-2006041047 A1 | * | 4/2006 | H01G 9/012 |
| WO | WO-2017056492 A1 | * | 4/2017 | H01G 9/012 |
| WO | WO-2022138223 A1 | * | 6/2022 | |

* cited by examiner

ELECTROLYTIC CAPACITOR

BACKGROUND

1. Technical Field

The present disclosure relates to an electrolytic capacitor.

2. Description of the Related Art

Electrolytic capacitors are mounted on various electronic devices. An electrolytic capacitor usually includes a capacitor element including an anode part and a cathode part, an anode lead terminal, a cathode lead terminal, and an exterior body covering the capacitor element. The anode lead terminal is electrically connected to the anode part, and the cathode lead terminal is electrically connected to the cathode part.

Conventionally, lead terminals having various shapes have been proposed (for example, Unexamined Japanese Patent Publication No. 2015-088718). Unexamined Japanese Patent Publication No. 2015-088718 discloses an anode lead frame including an expansion part that plays a role of enhancing fixing strength with a molding part.

SUMMARY

One aspect of the present disclosure relates to an electrolytic capacitor. The electrolytic capacitor includes a bottom surface, and a top surface opposite to the bottom surface, and includes: a capacitor element including an anode lead; an anode lead terminal and a cathode lead terminal each electrically connected to the capacitor element; and an exterior resin disposed around the capacitor element. At least one of the anode lead terminal or the cathode lead terminal includes a terminal part exposed on the bottom surface, and two anchor parts each extending from the terminal part and embedded in the exterior resin. The terminal part includes a side end along a direction in which the anode lead extends, and each of the two anchor parts includes an upright part rising from the side end of the terminal part toward the top surface, and an extending part bending and extending from an upper end of the upright part.

According to the present disclosure, an electrolytic capacitor having high terminal strength is obtained.

DETAILED DESCRIPTIONS OF EMBODIMENT

Currently, it is required to increase terminal strength of an electrolytic capacitor. In such a situation, the present disclosure provides an electrolytic capacitor having high terminal strength.

Hereinafter, an exemplary embodiment of the present disclosure will be described with reference to examples, but the present disclosure is not limited to examples to be described below. In the following description, specific numerical values and materials may be provided as examples, but other numerical values and materials may be applied as long as the effect of the present disclosure can be obtained. It is to be noted that constituent elements of known electrolytic capacitors may be applied to constituent elements other than parts that are characteristics of the present disclosure.

(Electrolytic Capacitor)

An electrolytic capacitor of the present disclosure includes a bottom surface, and a top surface opposite to the bottom surface. Hereinafter, the bottom surface and the top surface may be referred to as "bottom surface (B)" and "top surface (T)", respectively. An electrolytic capacitor of the present disclosure includes a capacitor element including an anode lead, an anode lead terminal and a cathode lead terminal electrically connected to the capacitor element, and an exterior resin disposed around the capacitor element.

At least one of the anode lead terminal or the cathode lead terminal includes a terminal part exposed on bottom surface (B) and two anchor parts each extending from the terminal part and embedded in the exterior resin. Hereinafter, the lead terminal including the two anchor parts may be referred to as "lead terminal (L)". The terminal part includes a side end along direction D1 in which the anode lead extends. Each of the two anchor parts includes an upright part that rises from the side end of the terminal part toward top surface (T), and an extending part that bends and extends from an upper end of the upright part.

As described above, the anchor part (the upright part and the extending part) is embedded in the exterior resin. Further, a metal sheet constituting lead terminal (L) is bent at two points of a boundary between the terminal part and the upright part and a boundary between the upright part and the extending part. According to this configuration, a direction in which the upright part extends is different from a direction in which the extending part extends. Accordingly, the anchor part exhibits a high anchor effect. Hence, according to the present disclosure, it is possible to suppress separation of lead terminal (L) from the exterior resin. That is, according to the present disclosure, an electrolytic capacitor having high terminal strength and reliability can be obtained.

A size of the anchor part is not particularly limited as long as the anchor effect can be obtained. An example of the size of the anchor part will be described in a first exemplary embodiment.

The two anchor parts included in one lead terminal (L) are usually symmetrical with respect to a plane that is perpendicular to bottom surface (B) and passes through a central axis of the anode lead, but may not be symmetrical. When each of the anode lead terminal and the cathode lead terminal includes the anchor part, a shape of the anchor part of the anode lead terminal and a shape of the anchor part of the cathode lead terminal may be the same or different.

In the electrolytic capacitor of the present disclosure, it is preferable that the entire surface of the extending part is in contact with the exterior resin. From another point of view, in the electrolytic capacitor of the present disclosure, it is preferable that the anchor part is not in contact with the capacitor element. According to these configurations, a high anchor effect can be obtained.

The two anchor parts may be bent in different directions (reverse rotation directions) at the boundary between the terminal part and the upright part and the boundary between the upright part and the extending part. Here, bending in different directions means that a metal sheet constituting lead terminal (L) is bent such that one surface (surface near top surface (T)) of the metal sheet has a valley shape at the boundary between the terminal part and the upright part, and is bent such that the one surface has a mountain shape at the boundary between the upright part and the extending part. More specifically, the extending parts of the two anchor parts may be bent from the upper end of the upright part and extend in directions away from each other. That is, the extending parts of the two anchor parts may be bent from the upper end of the upright part and extend in directions away from each other with respect to a direction perpendicular to a direction in which the anode lead extends. The anchor part having this configuration is easily formed. Further, when the anchor part having this configuration is used, it is easy to fill a material (mold resin or the like) of the exterior resin. Note that the two anchor parts may be bent in the same direction (the same rotation direction) at the boundary between the terminal part and the upright part and the boundary between the upright part and the extending part.

In the electrolytic capacitor of the present disclosure, each of the anode lead terminal and the cathode lead terminal may include two anchor parts. According to this configuration, an electrolytic capacitor having particularly high terminal strength and reliability can be obtained. Alternatively, only the anode lead terminal may include the two anchor parts, or only the cathode lead terminal may include the two anchor parts.

Hereinafter, an example of constituent elements of the electrolytic capacitor of the present disclosure will be described.

(Anode Lead Terminal)

The anode lead terminal may be formed by processing one metal sheet by a known metal processing method. A material of the anode lead terminal may be any material that can be used as the material of the anode lead terminal of the electrolytic capacitor. For example, a material of a known anode lead terminal used for the electrolytic capacitor may be used. The anode lead terminal may be formed by processing a metal sheet (including a metal plate and a metal foil) made of metal (copper, copper alloy, etc.). A surface of the metal sheet may be subjected to plating such as nickel plating or gold plating. A thickness of the metal sheet constituting the anode lead terminal may be in a range from 25 mm to 200 mm, inclusive (for example, in a range from 25 mm to 100 mm, inclusive).

The anode lead terminal may include an anode terminal part exposed on bottom surface (B), and a wire connection part rising from the anode terminal part toward top surface (T). As described above, the two anchor parts may extend from the anode terminal part. The anode lead of the capacitor element is connected to the wire connection part. The wire connection part may include a wire receiving part bent at a tip thereof so as to be substantially parallel to bottom surface (B). The wire receiving part may be bent toward a front surface of the capacitor element or may be bent in an opposite direction. Here, the front surface of the capacitor element is an end surface of the capacitor element from which the anode lead protrudes. The wire receiving part enables reliable and easy connection between the wire connection part and the anode lead.

(Cathode Lead Terminal)

The cathode lead terminal may be formed by processing one metal sheet by a known metal processing method. A material of the cathode lead terminal may be any material that can be used as a material of the cathode lead terminal of the electrolytic capacitor. For example, a known cathode lead terminal material used in an electrolytic capacitor may be used. The cathode lead terminal may be formed of the metal sheet exemplified as the material of the anode lead terminal.

The cathode lead terminal may include a cathode terminal part exposed on bottom surface (B), and a connection part electrically connected to a cathode part of the capacitor element. The cathode part of the capacitor element is electrically connected to the cathode terminal part via the connection part. As described above, the two anchor parts may extend from the cathode terminal part.

(Capacitor Element)

The capacitor element is not particularly limited. As the capacitor element, a capacitor element used in a known solid electrolytic capacitor or a capacitor element having a similar configuration may be used. Note that the electrolytic capacitor of the present disclosure may include a plurality of the capacitor elements. In this case, anode parts of the plurality of capacitor elements are electrically connected to the anode lead terminal.

An example of the capacitor element includes an anode part and a cathode part. The anode part includes an anode body having a dielectric layer formed on a surface thereof and an anode lead, and the cathode part includes an electrolyte layer and a cathode layer. The electrolyte layer is disposed between the dielectric layer formed on the surface of the anode body and the cathode layer. These constituent elements are not particularly limited, and constituent elements used for known solid electrolytic capacitors may be applied. Examples of these constituent elements will be described below.

(Anode Body)

As the anode body, for example, a columnar (for example, rectangular parallelepiped) porous sintered body obtained by sintering particles of a material for the formation may be used. Examples of the particles include particles of a valve metal, particles of an alloy containing a valve metal, and particles of a compound containing a valve metal. One of these kinds of particles may be used alone, or two or more thereof may be used in mixture. As the valve metal, titanium (Ti), tantalum (Ta), niobium (Nb), or the like is used. Alternatively, the anode body may be formed by roughening a surface of a base material (such as a foil-like or plate-like base material) containing the valve metal by etching or the like.

The anode part may be produced by the following method. First, a part of an anode lead is embedded in metal powder as a material of an anode body, and the metal powder is pressure-molded into a columnar shape (for example, a rectangular parallelepiped shape). Thereafter, the powder of the metal is sintered to form an anode body. In this way, the anode part including the anode body and the anode lead partially embedded in the anode body can be produced.

The dielectric layer formed on the surface of the anode body is not particularly limited, and may be formed by a known method. For example, the dielectric layer may be formed by anodizing the surface of the anode body by immersing the anode body in an anodizing solution. Alternatively, the dielectric layer may be formed by heating the anode body in an atmosphere containing oxygen to oxidize the surface of the anode body.

(Anode Lead)

The anode lead may be a wire (anode wire) made of metal. Examples of a material of the anode lead include the above-described valve metal, copper, aluminum, and aluminum alloy. A part of the anode lead is embedded in the anode body, and a remaining part protrudes from the anode body. Note that the anode lead is usually rod-like, but may be plate-like.

(Electrolyte Layer)

The electrolyte layer is not particularly limited, and an electrolyte layer used in a known solid electrolytic capacitor may be applied. Note that, in this specification, the electrolyte layer may be replaced with a solid electrolyte layer, and the electrolytic capacitor may be replaced with a solid electrolytic capacitor. The electrolyte layer may be a stacked body of two or more different electrolyte layers.

The electrolyte layer is disposed so as to cover at least a part of the dielectric layer. The electrolyte layer may be formed using a manganese compound or a conductive polymer. Examples of the conductive polymer include polypyrrole, polythiophene, polyaniline, and derivatives thereof. These polymers may be used alone or in combination of a plurality of polymers. Alternatively, the conductive polymer may be a copolymer from two or more kinds of monomers. Note that the derivative of the conductive polymer means a polymer having the conductive polymer as a basic skeleton. For example, examples of the derivative of polythiophene include poly(3,4-ethylenedioxythiophene) and the like.

A dopant may be added to the conductive polymer. The dopant can be selected depending on the conductive polymer, and a known dopant may be used. Examples of the dopant include naphthalenesulfonic acid, p-toluenesulfonic acid, polystyrenesulfonic acid, and salts thereof. An example of electrolyte layer is formed using poly(3,4-ethylenedioxythiophene) (PEDOT) doped with polystyrenesulfonic acid (PSS).

The electrolyte layer containing the conductive polymer may be formed by polymerizing a raw material monomer on the dielectric layer. Alternatively, the dielectric layer may be formed by applying a liquid containing a conductive polymer (and a dopant as necessary) to the dielectric layer and then drying the liquid.

(Cathode Layer)

The cathode layer may be a conductive layer formed on the electrolyte layer, for example, may be a conductive layer formed so as to cover the electrolyte layer. The cathode layer may include a carbon layer formed on the electrolyte layer, and a metal paste layer formed on the carbon layer. The carbon layer may be formed by a conductive carbon material such as graphite, and resin. The metal paste layer may be formed of metal particles (for example, silver particles) and a resin, and may be formed of, for example, a silver paste.

The cathode layer is electrically connected to the cathode lead terminal. The cathode layer may be electrically connected to the cathode lead terminal via a conductive member. The conductive member may be formed of metal particles (for example, silver particles) and a resin, and may be formed of, for example, a silver paste.

(Exterior Resin)

The exterior resin is disposed around the capacitor element so that the capacitor element is not exposed on the surface of the electrolytic capacitor. Further, the exterior resin insulates the anode lead terminal from the cathode lead terminal. A known exterior resin used for an electrolytic capacitor may be applied to the exterior resin. For example, the exterior resin may be formed using an insulating resin material used for sealing the capacitor element. Examples of a material of the exterior resin include epoxy resin, phenol resin, silicone resin, melamine resin, urea resin, alkyd resin, polyurethane, polyimide, unsaturated polyester, and the like. The exterior resin may contain a substance (such as an inorganic filler) other than the resin. The electrolytic capacitor may include a case disposed on at least a part of a surface of the exterior resin.

Hereinafter, an example of the electrolytic capacitor of the present disclosure will be specifically described with reference to the drawings. The above-described constituent elements can be applied to constituent elements of an electrolytic capacitor as an example described below. Further, constituent elements of an electrolytic capacitor as an example described below can be changed based on the above description. Furthermore, the matters described above may be applied to the exemplary embodiments described below. In addition, in the exemplary embodiments described below, constituent elements that are not essential to the electrolytic capacitor of the present disclosure may be omitted.

First Exemplary Embodiment

Figure 1:
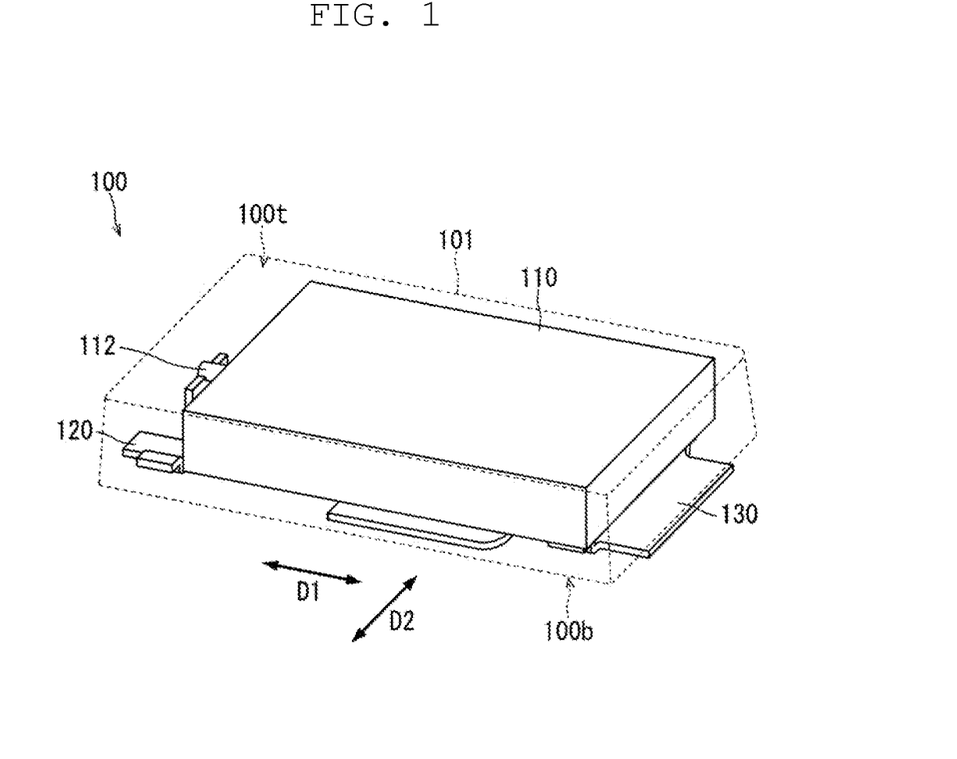
FIG. 1 is a perspective view schematically illustrating a configuration of an example of an electrolytic capacitor of the present disclosure.
Figure 2:
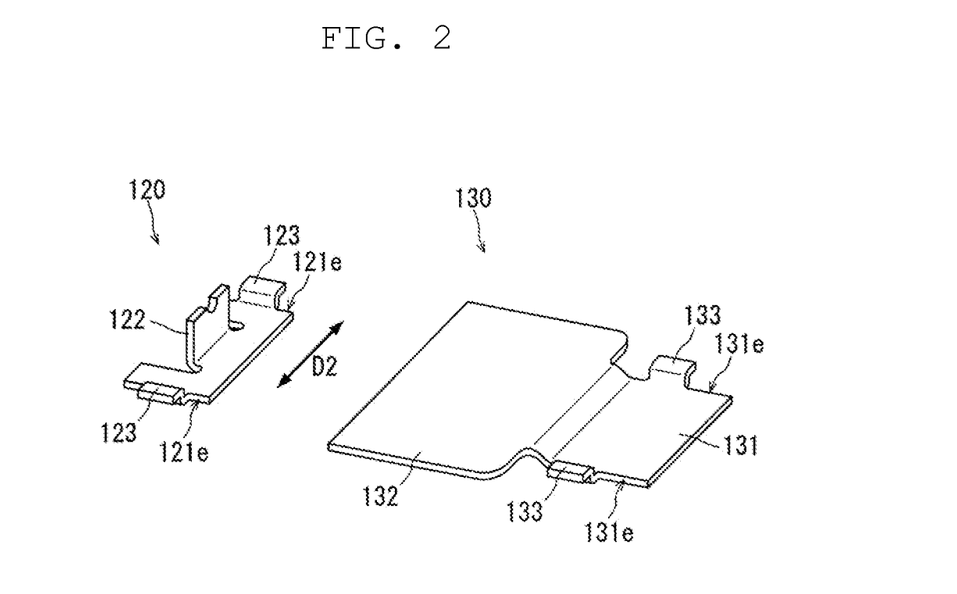
FIG. 2 is a perspective view schematically illustrating some members of the electrolytic capacitor illustrated in FIG. 1.
Figure 3:
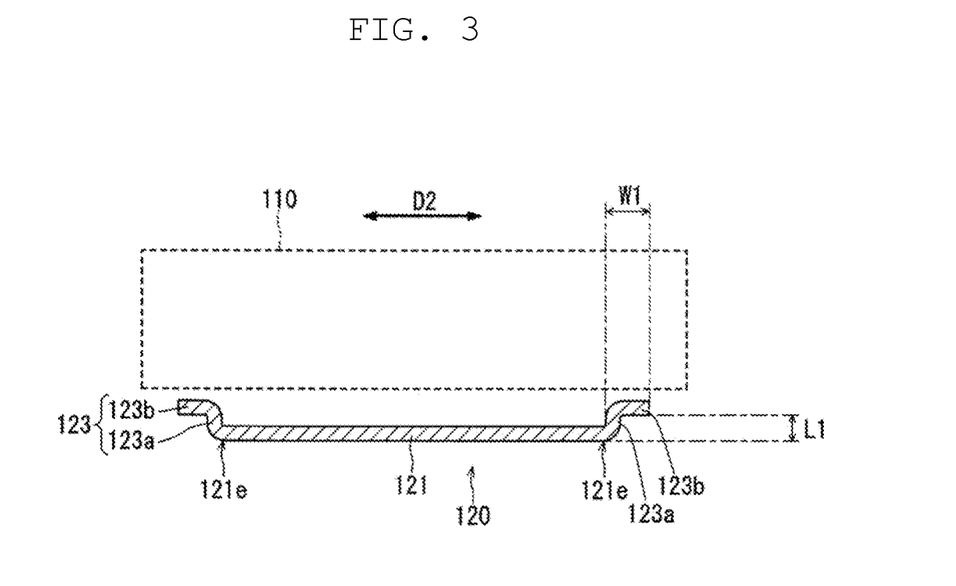
FIG. 3 is a cross-sectional view schematically illustrating an anode lead terminal of the electrolytic capacitor illustrated in FIG. 1.
Figure 4:
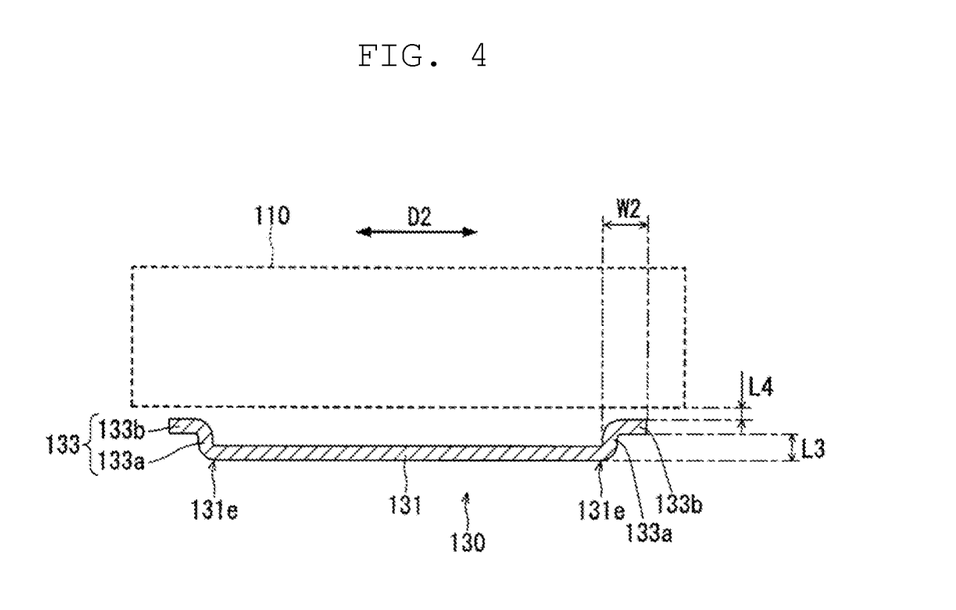
FIG. 4 is a cross-sectional view schematically illustrating a cathode lead terminal of the electrolytic capacitor illustrated in FIG. 1.
Figure 5:
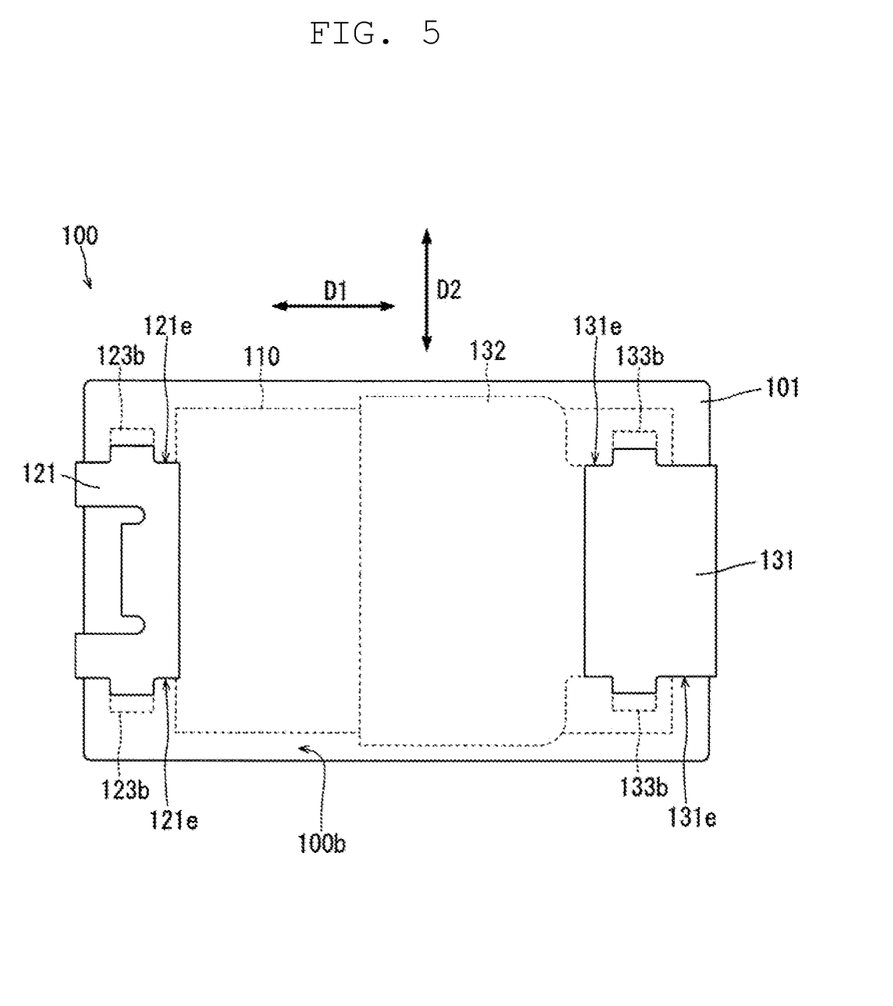
FIG. 5 is a perspective view schematically illustrating a bottom surface of the electrolytic capacitor illustrated in FIG. 1.
Figure 6:
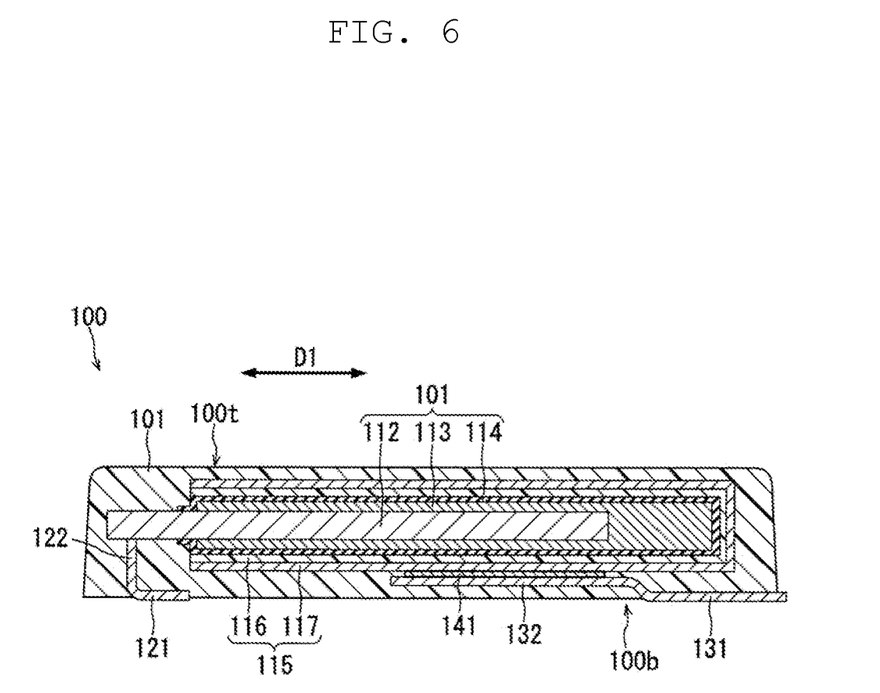
FIG. 6 is a cross-sectional view schematically illustrating the electrolytic capacitor illustrated in FIG. 1.

FIG. 1 schematically illustrates a perspective view of electrolytic capacitor 100 according to a first exemplary embodiment. FIG. 2 schematically illustrates a perspective view of anode lead terminal 120 and cathode lead terminal 130 of electrolytic capacitor 100 illustrated in FIG. 1. FIG. 3 illustrates a cross-sectional view of an anchor part of anode lead terminal 120. FIG. 4 illustrates a cross-sectional view of an anchor part of cathode lead terminal 130. Note that, in FIGS. 3 and 4, a position of capacitor element 110 is indicated by a dotted line. FIG. 5 schematically illustrates a bottom view of electrolytic capacitor 100 illustrated in FIG. 1. In FIG. 5, a part embedded in exterior resin 101 is indicated by a dotted line. Further, FIG. 6 schematically illustrates a cross-sectional view of electrolytic capacitor 100 illustrated in FIG. 1. The cross-sectional view of FIG. 6 is a cross-sectional view cut by a plane passing through a central axis of anode lead (anode wire) 112. Note that, for convenience of understanding, some constituent elements may be indicated only by contours in the following drawings. For example, in FIG. 1, exterior resin 101 is indicated only by an outline indicated by a dotted line.

Electrolytic capacitor 100 includes bottom surface 100b, and top surface 100t opposite to bottom surface 100b. Electrolytic capacitor 100 includes capacitor element 110, anode lead terminal 120, cathode lead terminal 130, conductive member 141, and exterior resin 101. Anode lead terminal 120 and cathode lead terminal 130 are electrically connected to capacitor element 110.

Referring to FIGS. 2 and 5, anode lead terminal 120 includes anode terminal part 121, wire connection part 122, and two anchor parts 123. Anode terminal part 121 is exposed at bottom surface 100b. Wire connection part 122 rises from anode terminal part 121 toward top surface 100t. A recess of wire connection part 122 for receiving a tip part of anode lead 112 is formed by resistance welding anode lead 112 and wire connection part 122. Anode lead 112 and wire connection part 122 may be connected by welding, soldering, or the like.

Referring to FIGS. 1 and 2, two anchor parts 123 extend from two side ends 121e, respectively. Two side ends 121e are side ends of anode terminal part 121, and are a pair of side ends each extending along direction D1 in which anode lead 112 extends.

Referring to FIGS. 1 and 3, each of two anchor parts 123 includes upright part 123a that rises from side end 121e toward top surface 100t, and an extending part 123b that bends and extends from an upper end of upright part 123a. In an example illustrated in the first exemplary embodiment, two anchor parts 123 are bent in different directions at a boundary between anode terminal part 121 and upright part 123a and a boundary between upright part 123a and extending part 123b. Specifically, one surface (surface near top surface 100t) of a metal sheet constituting anode lead terminal 120 is valley folded at the boundary between anode terminal part 121 and upright part 123a, and mountain folded at the boundary between upright part 123a and extending part 123b. As a result, extending part 123b extends from an upper end of upright part 123a toward an outside of electrolytic capacitor 100. That is, extending parts 123b of two anchor parts 123 are bent from upper ends of upright parts 123a, respectively, and extend in directions away from each other in direction (D2) that is perpendicular to direction (D1) in which anode lead 112 extends. A direction in which extending part 123b extends is substantially parallel to bottom surface 100b, and for example, an angle formed by extending part 123b and bottom surface 100b may be in a range from −20° to 20°, inclusive.

Cathode lead terminal 130 includes cathode terminal part 131, connection part 132, and two anchor parts 133. Cathode terminal part 131 is exposed at bottom surface 100b. Connection part 132 rises from anode terminal part 121 toward top surface 100t. Connection part 132 is electrically connected to cathode part 115 (cathode layer 117) described later via conductive member 141. That is, cathode terminal part 131 is electrically connected to capacitor element 110 via connection part 132 and conductive member 141. Conductive member 141 is not particularly limited, and a known conductive member may be used. For example, conductive member 141 may be formed of a metal paste or the like.

Two anchor parts 133 extend from two side ends 131e, respectively. Two side ends 131e are side ends of cathode terminal part 131, and are a pair of side ends each extending along direction D1 in which anode lead 112 extends.

Referring to FIGS. 1 and 4, each of two anchor parts 133 includes upright part 133a that rises from side end 131e toward top surface 100t, and extending part 133b that bends and extends from an upper end of upright part 133a. In an example illustrated in the first exemplary embodiment, the two anchor parts are bent in different directions at a boundary between cathode terminal part 131 and upright part 133a and a boundary between upright part 133a and extending part 133b. That is, extending parts 133b of two anchor parts 133 are bent from upper ends of upright parts 133a, respectively, and extend in directions away from each other with respect to direction (D2) that is perpendicular to direction (D1) in which anode lead 112 extends. A direction in which extending part 133b extends is substantially parallel to bottom surface 100b, and for example, an angle formed by extending part 133b and bottom surface 100b may be in a range from −20° to 20°, inclusive.

Referring to FIG. 3, distance L1 from a bottom surface of anode terminal part 121 to a bottom surface of extending part 123b may be 50 mm or more (for example, 75 mm or more or 100 mm or more). By setting distance L1 to 50 mm or more (for example, 75 mm or more or 100 mm or more), a region between extending part 123b and bottom surface 100b can be easily filled with exterior resin 101. Note that, in FIG. 3, a top surface of extending part 123b is located below a bottom surface of capacitor element 110. Meanwhile, extending part 123b may be located at a higher position as long as extending part 123b does not interfere with capacitor element 110.

Referring to FIG. 4, distance L3 from a surface of cathode terminal part 131 to a bottom surface of extending part 133b may be 50 mm or more (for example, 75 mm or more or 100 mm or more), or may be in a range from 50 mm to 500 mm, inclusive (for example, a range from 75 mm to 200 mm, inclusive). Distance L4 from a top surface of extending part 133b to the bottom surface of capacitor element 110 may be 50 mm or more (for example, 75 mm or more or 100 mm or more), or may be in a range from 50 mm to 500 mm, inclusive (for example, a range from 75 mm to 200 mm, inclusive). By setting distance L1 and distance L3 to 50 mm or more (for example, 75 mm or more or 100 mm or more), a region between extending part 133b and bottom surface 100b and a region between extending part 133b and capacitor element 110 can be easily filled with exterior resin 101.

Horizontal distance W1 (distance along direction D2) from side end 121e to a tip of extending part 123b and horizontal distance W2 (distance along direction D2) from side end 131e to a tip of extending part 133b may be 50 mm or more (for example, 75 mm or more or 100 mm or more). By setting horizontal distances W1 and W2 within this range, a high anchor effect can be obtained. Further, from the viewpoint of shape stability, processability, and the like, horizontal distances W1 and W2 may be 200 mm or more, respectively.

Note that the shapes of anode lead terminal 120 and cathode lead terminal 130 described above are merely examples, and are not limited to the above shapes. For example, either anode lead terminal 120 or cathode lead terminal 130 may not include the anchor parts. Further, as long as the connection part of cathode lead terminal 130 is electrically connected to cathode part 115 (cathode layer 117), the connection part may not be at the position illustrated in the drawing, and may not have the shape illustrated in the drawing.

Referring to FIG. 6, capacitor element 110 includes anode part 111 and cathode part 115. Anode part 111 includes anode body 113 having dielectric layer 114 formed on a surface thereof, and anode lead 112. Cathode part 115 includes electrolyte layer 116 disposed so as to cover dielectric layer 114, and cathode layer 117. Cathode layer 117 includes, for example, a carbon layer formed on electrolyte layer 116, and a metal particle layer formed on the carbon layer. The metal particle layer is, for example, a layer formed using a metal paste.

As described above, anode part 111 of capacitor element 110 is electrically connected to anode lead terminal 120, and cathode part 115 of capacitor element 110 is electrically connected to cathode lead terminal 130. When electrolytic capacitor 100 is mounted on a substrate or the like of an electronic device, it may be mounted by soldering anode terminal part 121 and cathode terminal part 131 to each other.

An example of a method of manufacturing electrolytic capacitor 100 will be described below. First, capacitor element 110, anode lead terminal 120, and cathode lead terminal 130 are prepared. A method of manufacturing capacitor element 110 is not particularly limited, and the capacitor element can be manufactured by a known method. Anode lead terminal 120 and cathode lead terminal 130 can be formed by a known metal processing method.

Next, anode lead 112 and anode lead terminal 120 are connected, and cathode layer 117 and cathode lead terminal 130 are connected. Anode lead 112 and anode lead terminal 120 can be connected by welding (for example, laser welding) or the like. Cathode layer 117 and cathode lead terminal 130 can be connected by, for example, the following method. First, a metal paste to be conductive member 141 is applied to a surface of connection part 132 of cathode lead terminal 130 and/or a surface of cathode layer 117. Next, cathode layer 117 and connection part 132 are bonded to each other with the metal paste interposed therebetween, and by curing the metal paste, the metal paste becomes conductive member 141. In this way, cathode layer 117 and cathode lead terminal 130 can be connected to each other.

Next, the capacitor element is sealed with a material (for example, mold resin) of exterior resin 101. A sealing step can be performed by a known method. In this way, electrolytic capacitor 100 can be manufactured. Note that other electrolytic capacitors of the present disclosure can also be manufactured by the same manufacturing method.

The present disclosure can be used for an electrolytic capacitor.

What is claimed is:

1. An electrolytic capacitor including a bottom surface, and a top surface opposite to the bottom surface, the electrolytic capacitor comprising:
    a capacitor element including a cathode part and an anode part including an anode lead;
    an anode lead terminal electrically connected to the anode lead of the capacitor element;
    a cathode lead terminal electrically connected to the cathode part of the capacitor element; and
    an exterior resin disposed around the capacitor element, wherein:
    the anode lead terminal and the cathode lead terminal are arranged along a first direction in which the anode lead extends,
    the cathode lead terminal includes a cathode terminal part exposed on the bottom surface, and two cathode anchor parts each extending from the cathode terminal part and embedded in the exterior resin,
    the cathode terminal part has a side end that is disposed at each of both ends in a second direction perpendicular to the first direction and extends along the first direction, and
    each of the two cathode anchor parts includes a cathode upright part rising from the side end of the cathode terminal part toward the top surface, and a cathode extending part bending and extending from an upper end of the cathode upright part.

2. The electrolytic capacitor according to claim 1, wherein an entire surface of the cathode extending part is in contact with the exterior resin.

3. The electrolytic capacitor according to claim 1, wherein the cathode extending part of one of the two cathode anchor parts and the cathode extending part of another of the two cathode anchor parts are each bent from an upper end of the cathode upright part, and extend in directions away from each other.

4. The electrolytic capacitor according to claim 1, wherein:
    the anode lead terminal includes an anode terminal part exposed on the bottom surface, and two anode anchor parts each extending from the anode terminal part and embedded in the exterior resin,
    the anode terminal part has a side end that is disposed at each of both ends in a second direction perpendicular to the first direction and extends along the first direction, and each of the two anode anchor parts includes an anode upright part rising from the side end of the anode terminal part toward the top surface, and an anode extending part bending and extending from an upper end of the anode upright part.

5. The electrolytic capacitor according to claim 4, wherein an entire surface of the anode extending part is in contact with the exterior resin.

6. The electrolytic capacitor according to claim 4, wherein the anode extending part of one of the two anode anchor parts and the anode extending part of another of the two anode anchor parts are each bent from an upper end of the anode upright part, and extend in directions away from each other.

* * * * *